Aug. 4, 1970    M. W. THRING    3,522,859
WALKING MACHINE
Filed Jan. 22, 1968    4 Sheets-Sheet 1
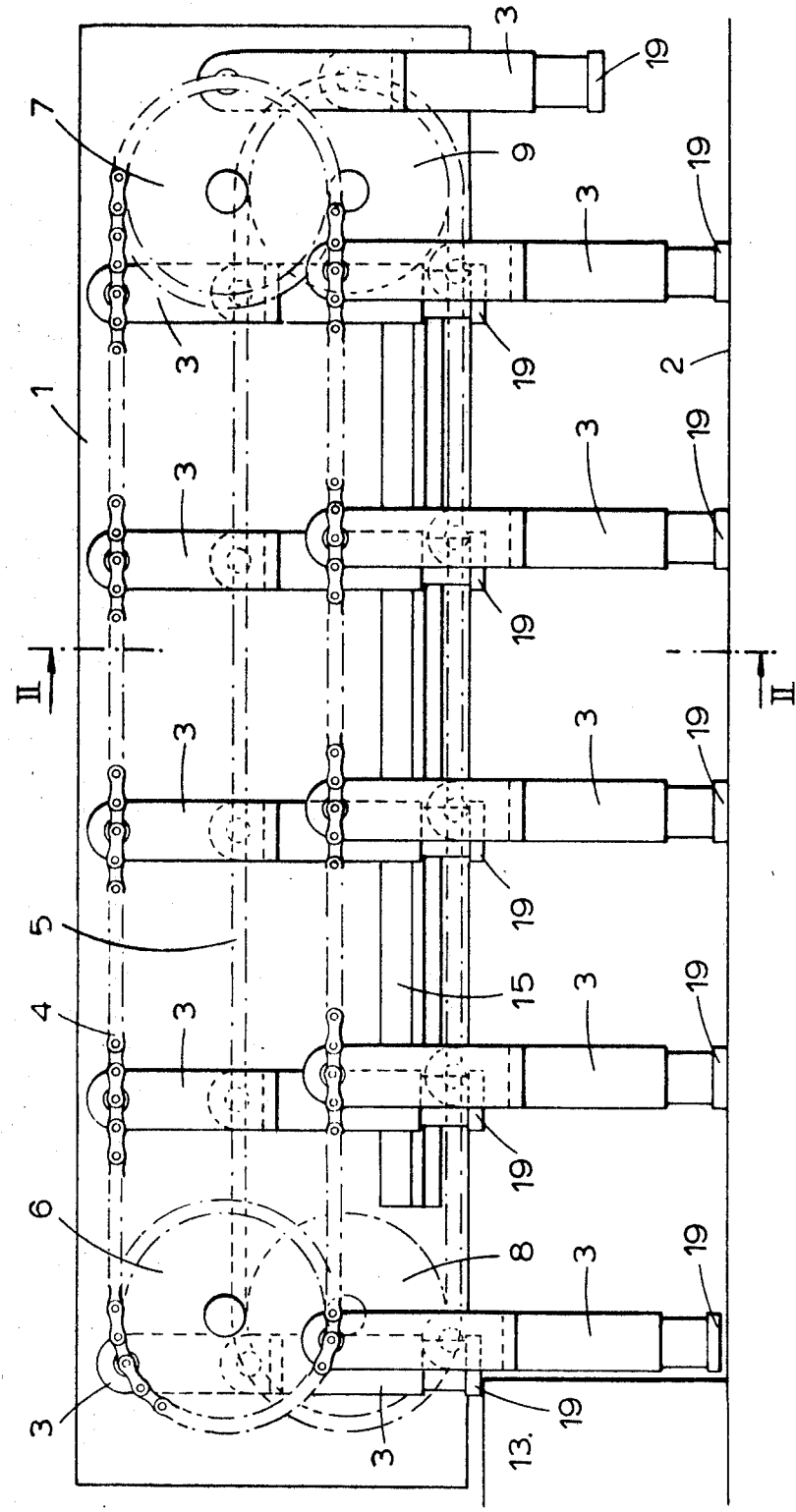

Aug. 4, 1970   M. W. THRING   3,522,859
WALKING MACHINE

Filed Jan. 22, 1968   4 Sheets-Sheet 2

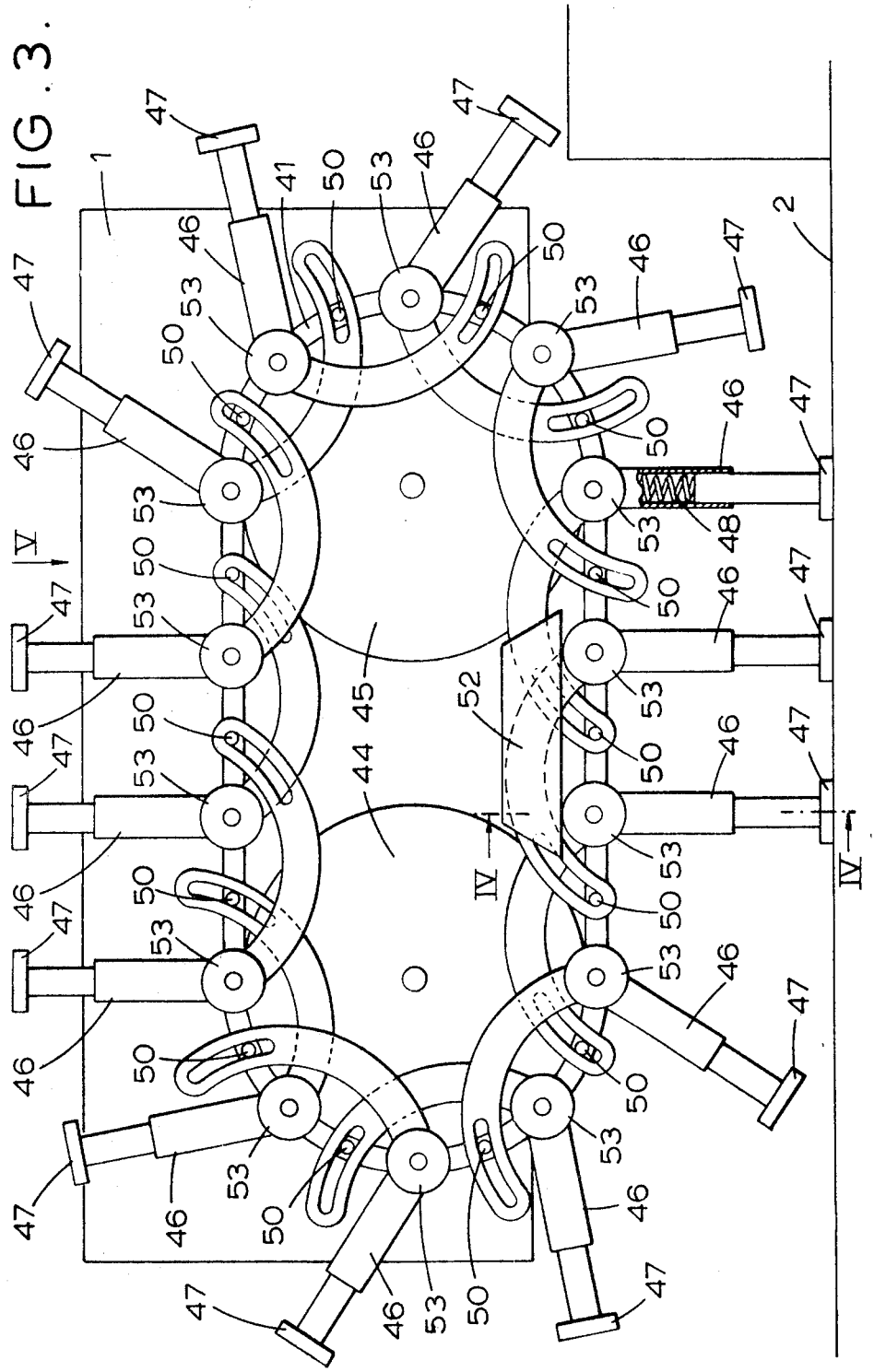

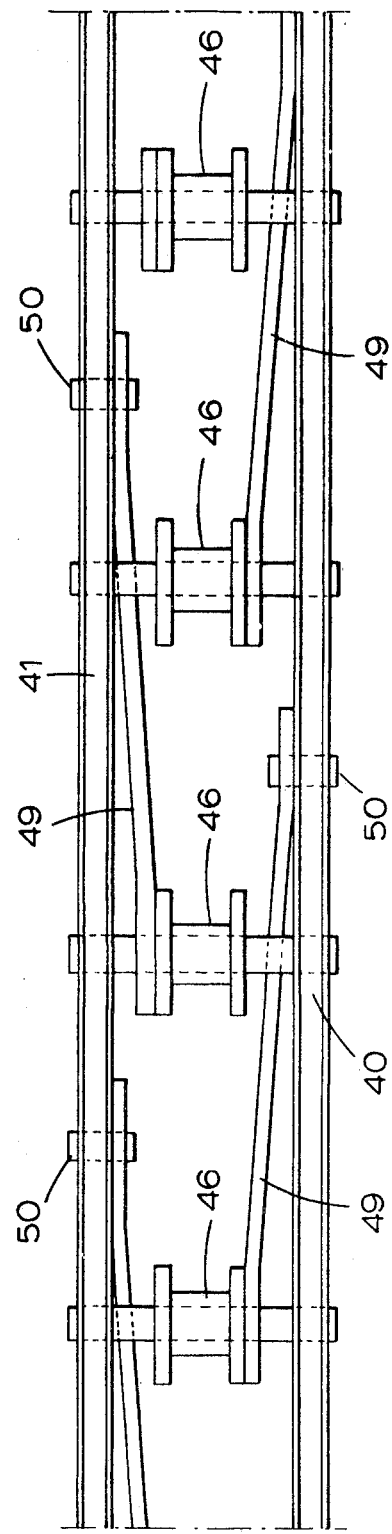

United States Patent Office 3,522,859
Patented Aug. 4, 1970

3,522,859
WALKING MACHINE
Meredith W. Thring, The Coach House, Powell Road,
Buckhurst Hill, Essex, England
Filed Jan. 22, 1968, Ser. No. 699,716
Claims priority, application Great Britain, Jan. 26, 1967,
4,046/67
Int. Cl. B62d 57/02
U.S. Cl. 180—8                                17 Claims

ABSTRACT OF THE DISCLOSURE

A vehicle adapted to traverse the ground comprising a frame, a set of legs for supporting the frame from the ground and arranged in line along the direction of travel of the vehicle, and a pair of equal length continuous bands mounted on wheels that are rotatable on the frame. The legs are pivotally mounted on the bands, and the frame is movable over the legs in the direction of travel of the vehicle when the bands are driven by the wheels to move the legs from the rear to the front of the vehicle. In one embodiment, the bands are mounted at the same height on the frame, and, in another embodiment, the bands are displaced vertically on the frame relative to each other.

---

This invention relates to a form of vehicle which is supported for traverse across the ground on a series of legs which are arranged to operate in such manner as to support and propel the vehicle.

Previously vehicles have been provided with endless tracks to enable them to traverse a variety of terrains including irregular and stepped surfaces. However, such endless tracks while finding wide application are not entirely suitable for climbing a stepped surface, or for use over terrains comprising a heavy soil. In this latter instance, the wide area over which the endless tracks exert pressure, tends to compact the soil which can be a disadvantage for instance on an agricultural tractor.

It is therefore an object of the present invention to provide means for supporting and propelling a vehicle for traverse over varying terrains with a walking action.

Accordingly the present invention provides a vehicle arranged to traverse the ground including a frame and means for supporting that frame from the ground comprising a set of legs arranged in line along the direction of travel of the vehicle to engage the ground generally vertically, means for mounting said frame on the upper part of said legs so that said frame is movable over said legs in the direction of travel of the vehicle, power means for driving said frame over said legs and mechanism for lifting the leg of said set beneath the rear part of the frame when in motion, from the ground and positioning it beneath the front part of said frame to provide continuous such support for said vehicle during travel.

In order to promote a fuller understanding of the invention one embodiment will now be described, by way of example only, with reference to the accompanying drawings, in which:

FIG. 1 is a schematic side elevation of one embodiment of the invention,

FIG. 3 is a schematic side elevation of a second embodiment of the invention,

FIG. 5 is a schematic plan view taken on the arrow V of FIG. 3.

Figure 4:
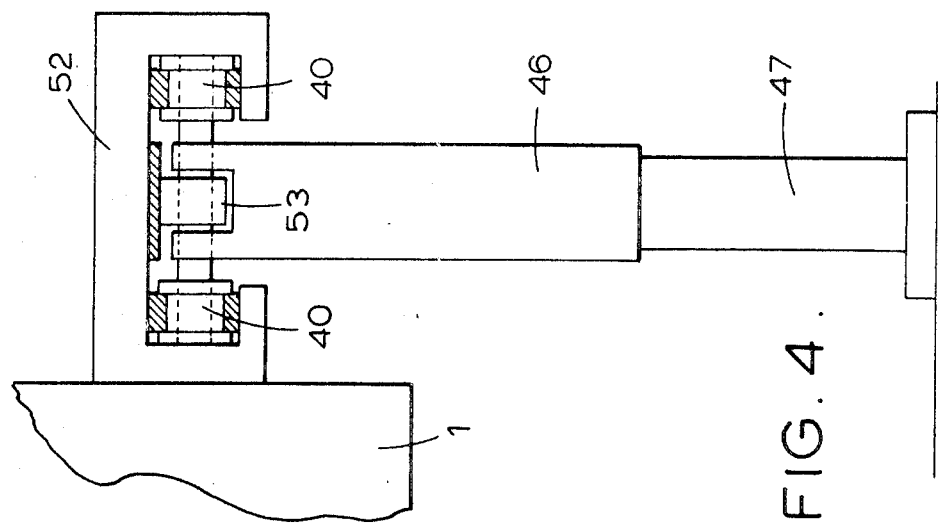
FIG. 4 is a schematic cross-sectional view taken on the line IV—IV of FIG. 3.

For convenience one side only of the vehicle in either embodiment is shown and described with reference to the drawings it being understood that the two sides are substantially the same but of opposite hand in essential details.

FIG. 1 shows the vehicle of one embodiment comprising a frame shown generally at 1, arranged to be supported above the ground indicated at 2 by a set of legs 3.

In this embodiment two continuous bands in the form of roller chains 4 and 5 extend in the general longitudinal direction of the frame 1 between identical chain sprocket wheels 6 and 7 and 8 and 9 respectively on both sides of the frame 1. The chain sprockets 8 and 9 are mounted for rotation on the frame 1 of the vehicle and one of the sprockets 8 or 9 is arranged to be driven in known manner per se by a power unit through suitable gear boxes (not shown) from a power unit (not shown) mounted within the frame 1.

The chain sprockets 6 and 7 are mounted for rotation on arms 10 (not shown in FIG. 1 for clarity) extending from the side of the frame 1 and are so positioned that the chain 4 is disposed above and slightly outside chain 5 on each side of the frame.

In order to drive the chain sprocket wheels 6 or 7 from and in synchronism with, the chain sprocket wheels 8 or 9, a simple drive mechanism (not shown) between the axles supporting wheels 6 and 8 or 7 and 9 is provided in known manner per se.

Figure 2:
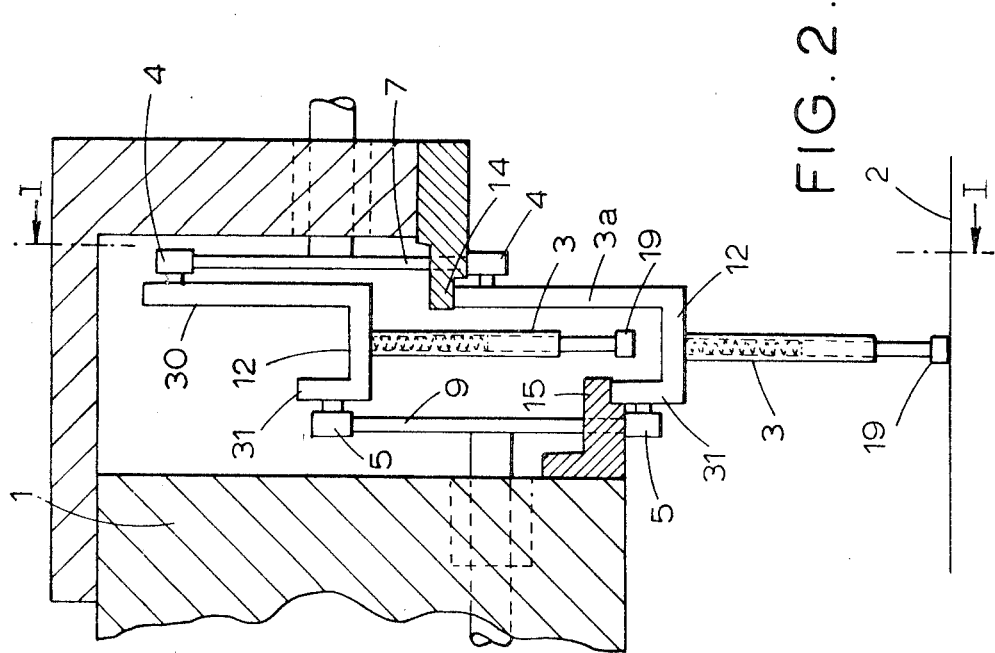
FIG. 2 is a schematic cross-sectional view taken on the line II—II of FIG. 1.

A set of identical legs 3 are mounted between the chains 4 and 5 in the disposition shown so as to support the frame 1. The upper end of each leg 3 is pivotally mounted to one of the links of the chain 4, and the approximate mid-length of each leg 3 is pivotally mounted to a correspondingly positioned link of the chain 5. The legs 3 are mounted in equal pitches all the way round the chains 4 and 5. As seen in FIG. 2 in order that the legs 3 can be mounted on the chains 4 and 5, they are provided with an unequal armed fork portion 12 to accommodate the sideways displacement between the positions of chains 4 and 5 and are mounted on the chains 4 and 5 by way of the arms 30 and 31 of the fork portion 12 respectively.

The legs 3 are all disposed at right angles relative to the longitudinal axis of the frame 1, and if the chains 4 and 5 are driven around their respective sprocket wheels in synchronism, it can be seen that the legs 3 will circulate around on the chains and will be maintained in this disposition. Further, it can be seen that the legs will recirculate over the sprocket wheels in a vertical disposition as shown, by way of example, at the right-hand end of FIG. 1. Further it can be seen that as the chains 4 and 5 are driven the vehicle will progress across level ground with each leg 3 being successively planted on the ground substantially vertically in front of the vehicle, the vehicle being traversed over the legs 3 which are supporting it as it progresses across the ground, and each leg 3 being lifted from the ground at the rear of the vehicle substantially vertically to be recirculated over the top of the chains 4 and 5 and subsequently brought into contact with the ground again at the front of the vehicle.

It can be seen that the weight of the vehicle is thus taken by a plurality of legs 3 on each side, and it is traversed across the ground by them, the legs moving in a half cycloid in relation to the ground on their downward path thereto the height of the cycloid being the diameter of the sprocket wheels 6, 7, 8, 9. This allows the vehicle a smooth forward motion.

Further if the vehicle approaches a stop or other vertical obstacle, since the legs 3 are brought into contact with level ground generally vertically, they will come down onto the top of that step or obstruction (provided the vertical height of the step or obstruction is not more than the diameter of the sprocket wheels) and the front of the vehicle will be consequently lifted up by that leg 3 to progress over it. Such a step is shown by way of example in solid outline 13 in FIG. 1.

In order to relieve the chains 4 and 5 of the weight of the vehicle, guide tracks 14 and 15 are provided for the chains mounted on the frame 1. The guide tracks 14 and 15 provide two surfaces as shown in FIG. 2 against which those legs 3 which are supporting the vehicle, and that part of the chains 4 and 5 respectively to which those legs 3 are attached, may bear. Thus the weight is transferred from the legs 3 to the frame 1 without creating excessive tension in the chains 4 and 5. The guide tracks 14 and 15 also help to ensure that the legs 3 do not interfere with one another as they circulate around the chains 4 and 5.

An alternative form of leg (not shown) is similar to those shown at 3 with the exception that the vertical portion is narrower in width and it is provided with a wider foot portion to contact the ground.

The foot portions 19 of the legs 3 may be adapted to the surface of the ground 2 over which the vehicle is to be used and are preferably telescopically movable within the legs 3 against a resilient member such as a compression spring, so that the legs 3 may vary in length to accommodate small irregularities in the ground. For instance, if the vehicle to which the invention is applied is to be an agricultural tractor, then the feet 19 of the legs should be so arranged that they sink a small distance into the soil of a field on which the tractor is being used under the load of the tractor, while not penetrating so far that the bottom of the frame 1 comes into contact with the ground. In which way, the optimum tractive adhesion may be achieved from the feet 19 while not unduly disturbing the ground by the passage of the vehicle. Further the feet 19 may be provided with a resilient sole (not shown) of, for instance, vulcanised rubber, which would not alter their tractive or penetration qualities over muddy ground, but would provide a smoother and much quieter ride for the vehicle on conventional road surfaces. This last feature exhibits a further advantage over endless track vehicles in that these not only damage a road surface, but also are extremely noisy when operating on them.

A further application of the invention which is envisaged is in small vehicles for the assistance and carriage of handicapped persons. The design of a carriage for a handicapped person presents very considerable problems when it is desired to provide a carriage which the person may use in a house or building which has steps or staircases therein. A vehicle according to the invention could form the basis of such a carriage on which a handicapped person could ride, or could form a sub-carriage onto which a more conventional wheeled carriage may be placed when it is desired to exploit the characteristics of a vehicle according to the invention.

When a vehicle according to the invention is used for traversing staircases, it progresses up them initially in the manner described above, and then as more of the legs 3 come into contact with the staircase, the vehicle settled on the stairs so that only some of the legs 3 are actually in contact with the stairs according to the relationship between the pitch of the stairs and the pitch of the legs 3 around the chains 4 and 5.

In all the above description, it has been assumed that the vehicle is travelling in a straight line. However, when it is desired to steer the vehicle, it can be seen that this can be readily achieved by the differential control of the speed at which the chains 4 and 5 on each side of the vehicle are driven or even by reversing one of the pairs of chains 4 and 5 in an exactly similar manner to a conventional endless tracked vehicle. Such speed control or reversal may be readily achieved with differential gears in known manner. Further, it can be seen that the vehicle may be driven in either direction in an exactly similar manner.

In order to promote better steering qualities of the vehicle described above, the guide tracks 14 and 15 may be made curved so as to bow slightly downwards from each end towards the middle of the vehicle. This has the effect of concentrating the support given by the legs 3 onto the legs 3 at the middle of the vehicle, allowing the vehicle to pivot more easily about the central legs during steering by differential driving of the chains 4 and 5 on each side of the vehicle.

FIGS. 3, 4 and 5 show an alternative embodiment of the invention in which the two chains 4 and 5 of the previous embodiment are replaced by two chains 40 and 41 which are disposed side by side on either side of the vehicle. The chains 40 and 41 are arranged around chain sprockets 42 and 43, and 44 and 45 respectively carried on the frame 1, and are arranged to be driven in known manner per se to drive the vehicle across the ground.

The legs 46 of this embodiment are generally similar to legs 3 of the previous embodiment with telescopic foot portions 47 similarly provided with supporting springs 48 within the legs 46. Each leg 46 is pivotally mounted at one end on a pin which passes through the two roller chains 40 and 41, so as to be disposed between the chains 40 and 41. In order to maintain the legs 46 in their correct angular relationship to the run of the chains 40 and 41, particularly when they are beneath and supporting the vehicle, each leg 46 is provided with an arm 49 rigidly attached thereto at the end mounted on the chains 40 and 41, and having the other end in slidable engagement with a peg 50 which is mounted on one or other of the chains 40 or 41 alternately for alternate legs 46, at the point displaced from the mounting of that leg 46. The arms 49 are curved so as to extend over the pivotal mounting of the adjacent leg 46 on one side, and are each provided with a slot 51 to allow limited sliding movement of the arm 49 relative to pin 50 as the legs 46 are carried around the sprockets 42 and 44; or 43 and 45 on the chains 40 and 41.

Again in order to relieve the tension in the chains 40 and 41 the frame of the vehicle is provided with a guide 52, which may also be slightly bowed downwards from each end towards the middle, to bear on the tops of the legs 46 to support the vehicle therefrom. The legs 46 are each provided with a roller rotatably mounted on the pin by which they are mounted on the chains 40 and 41, the rollers 53 running on the guide 52.

The general motion of the second embodiment is generally similar to the previous embodiment, with the exception that the legs are not brought to the ground in front of the vehicle and lifted from the ground behind the vehicle vertically as in the previous embodiment, but are brought down and lifted with a swinging motion as depicted particularly in FIG. 3. However, the action by which the vehicle may climb over steps or other obstructions is generally similar, a typical step being illustrated at 54 in FIG. 3.

What I claim is:

1. A vehicle arranged to traverse the ground; said vehicle including a frame; means for supporting said frame from the ground in the form of a set of legs disposed in line along the direction of travel of the vehicle; means for mounting said frame on said legs so that the frame is movable over said legs in the direction of travel of the vehicle; said mounting means including two equal length continuous bands disposed side-by-side at the same height on said frame, and pairs of wheels mounted for rotation on said frame, each pair of wheels having one of said two bands entrained therearound; each leg of said set of legs being pivotally mounted on each of said two bands by means of a linkage passing between said two bands with the legs being spaced around said bands; and power means for driving at least one wheel of said pairs of wheels to move said frame over said legs and recirculate said legs on said bands from the rear of the vehicle to the front of the vehicle.

2. A vehicle according to claim 1, wherein each leg of said set of legs is provided with an arm rigidly attached thereto and disposed at said one end thereof, said arm being in slidable engagement with a peg provided on one of said two bands at a point displaced along said band from the mounting point of said leg.

3. A vehicle according to claim 1, wherein there is provided one said set of legs and two continuous bands on each side of the frame, the bands being in the form of roller chains and the pairs of wheels associated therewith being in the form of chain sprockets.

4. A vehicle according to claim 3, wherein a differential gear is provided in the drive from said power drive means to said wheels on each side of said frame whereby the vehicle may be steered.

5. A vehicle according to claim 3, wherein said frame is provided with a guide way extending in the direction of travel and arranged to bear on one of said bands and on said legs which are beneath said frame in order to support said frame therefrom.

6. A vehicle according to claim 5, wherein each leg of said set of legs is provided with a roller which engages said guide way when the leg is beneath the frame.

7. A vehicle according to claim 5, wherein said guide way is curved and bows downward toward the centre of said frame.

8. A vehicle according to claim 1, wherein each leg of said set of legs includes a foot portion telescopically mounted therein and resilient means provided within said leg to urge said foot portion outwardly.

9. A vehicle arranged to traverse the ground; said vehicle including a frame; means for supporting said frame from the ground in the form of a set of legs disposed in line along the direction of travel of the vehicle; means for mounting said frame on said legs so that the frame is movable over the legs in the direction of travel of the vehicle; said mounting means including two equal length continuous bands disposed side-by-side on said frame, one of said two bands being displaced vertically on said frame relative to the other of said two bands, and pairs of wheels mounted for rotation on said frame, each pair of wheels having one of said bands entrained therearound; each leg of said set of legs being pivotably mounted on the upper of said two bands and on the lower of said two bands, with the legs being spaced around said bands; and power means for driving at least one wheel of said pairs of wheels to move said frame over said legs and recirculate said legs on said bands from the rear of the vehicle to the front of the vehicle.

10. A vehicle according to claim 9, wherein each of said legs has a fork portion with a longer arm pivotably mounted on the upper of said two bands and a shorter arm pivotably mounted on the lower of said two bands.

11. A vehicle according to claim 9, wherein there is provided one said set of legs and two bands on each side of the frame, the bands being in the form of roller chains and the wheels associated therewith being in the form of chain sprockets.

12. A vehicle according to claim 11, wherein a differential gear is provided in the drive from said power drive means to said wheels on each side of said frame whereby the vehicle may be steered.

13. A vehicle according to claim 11, wherein there is provided a guide way extending in the direction of travel and arranged to bear on one of said bands and upon said legs which are beneath said frame in order to support said frame therefrom.

14. A vehicle according to claim 13, wherein each leg of said set of legs is provided with a roller which engages said guide way when the leg is beneath the frame.

15. A vehicle according to claim 13, wherein said guide way is curved and bows downward toward the centre of said frame.

16. A vehicle according to claim 9, wherein each leg of said set of legs includes a foot portion telescopically mounted therein and resilient means provided within said leg to urge said foot portion outwardly.

17. A vehicle according to claim 9, wherein each leg is pivotally mounted at one end on the upper of said bands and at an intermediate point on the lower of said bands.

References Cited

UNITED STATES PATENTS

| | | |
|---|---|---|
| 880,526 | 3/1908 | Hele-Shaw. |
| 992,736 | 5/1911 | Kohn. |
| 1,285,317 | 11/1918 | Mouras. |
| 1,603,934 | 10/1926 | Bennett. |
| 3,196,970 | 7/1965 | Brenner. |

FOREIGN PATENTS

| | | |
|---|---|---|
| 757,335 | 9/1956 | Great Britain. |
| 40,528 | 4/1912 | Sweden. |

OTHER REFERENCES

Coenders, J., German DAS 1,061,642, published July 16, 1959.

LEO FRIAGLIA, Primary Examiner

U.S. Cl. X.R.

305—1